United States Patent [19]

Willis

[11] 4,146,441

[45] Mar. 27, 1979

[54] ADDITIVE COMPOSITIONS, BATHS, AND METHODS FOR ELECTRODEPOSITING BRIGHT ZINC DEPOSITS

[75] Inventor: William J. Willis, North Royalton, Ohio

[73] Assignee: R. O. Hull & Company, Inc., Ohio

[21] Appl. No.: 894,631

[22] Filed: Apr. 10, 1978

Related U.S. Application Data

[63] Continuation-in-part of Ser. No. 839,922, Oct. 6, 1977, abandoned.

[51] Int. Cl.$^2$ .......................... C08G 12/06; C25D 3/22
[52] U.S. Cl. ............................ 204/55 R; 204/DIG. 2; 252/182; 528/265
[58] Field of Search ............ 204/55 R, 55 Y, DIG. 2; 528/265; 252/182

[56] References Cited

U.S. PATENT DOCUMENTS

| | | | |
|---|---|---|---|
| 2,369,439 | 2/1945 | Cupery | 528/265 X |
| 3,655,534 | 4/1972 | Kampe | 204/55 R |
| 4,007,098 | 2/1977 | Rosenberg | 204/55 R |

*Primary Examiner*—G. L. Kaplan
*Attorney, Agent, or Firm*—Maky, Renner, Otto & Boisselle

[57] ABSTRACT

A composition as described which is useful particularly in improving the electrodeposition of bright zinc from aqueous acidic plating baths. The new composition comprises a reaction product obtained by the process of preparing an intermediate composition by reacting formaldehyde in water with sulfamic acid and at least one aliphatic acyclic amine containing at least one primary amine group, and thereafter reacting said intermediate compound with at least one epihalohydrin or glycerol halohydrin or mixtures thereof. Aqueous acidic zinc plating baths containing the additive compositions of the invention and methods for depositing a bright zinc coating over a wide range of current densities also are described.

23 Claims, No Drawings

ADDITIVE COMPOSITIONS, BATHS, AND METHODS FOR ELECTRODEPOSITING BRIGHT ZINC DEPOSITS

CROSS-REFERENCE TO RELATED APPLICATION

This application is a continuation-in-part of my pending application Ser. No. 839,922, filed Oct. 6, 1977 now abandoned.

BACKGROUND OF THE INVENTION

This invention relates to improvements in the electrodeposition of zinc from aqueous acidic plating baths, and particularly to new compositions which are useful as additives in plating baths for plating bright and level zinc deposits from aqueous acid plating baths, and more particularly to such baths containing relatively high concentrations of metal.

Considerable attention has been directed over the years to the development of zinc electroplating baths which will produce bright and level zinc deposits of improved quality. Much research has been devoted to improving the overall brightness, the range of allowable current densities, and the ductility of the zinc deposit. Until recently, most of the successful zinc plating baths were aqueous alkaline zinc plating baths containing substantial quantities of cyanide which has caused concern regarding toxicity and waste disposal problems. Accordingly, activity in the plating area has been devoted either to the development of cyanide-free alkaline plating baths or improvements in acid plating baths. This invention relates to acid plating baths.

SUMMARY OF THE INVENTION

The present invention relates to a novel composition which is useful as a brightening agent in aqueous acid plating baths and which comprises the reaction product prepared from a mixture of sulfamic acid, at least one aliphatic acyclic amine containing at least one primary amine group, formaldehyde, and an epihalohydrin or a glycerol halohydrin or mixtures thereof. The present invention also relates to aqueous acidic plating baths containing said novel compositions and to methods for the electrodeposition of bright and level zinc deposits from such baths.

DESCRIPTION OF THE PREFERRED EMBODIMENTS

The compositions of this invention which are useful particularly as additive compositions for aqueous acidic zinc electroplating baths are reaction products which are obtained by the process of (a) preparing an intermediate composition by reacting formaldehyde in water with a mixture of
  i. sulfamic acid, and
  ii. at least one aliphatic acyclic amine containing at least one primary amine group, and (b) reacting said intermediate composition with at least one epihalohydrin or glycerol halohydrin or mixtures thereof.

The aliphatic acyclic amines containing at least one primary amine group which are useful in the preparation of the compositions of the invention preferably are compounds containing two amino groups such as those having the formula

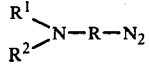

wherein R is an alkylene group containing from about 2 to 10 carbon atoms, and $R^1$ and $R^2$ are each independently hydrogen or alkyl groups containing from 1 to about 5 carbon atoms. Specific examples of aliphatic acyclic amines containing at least one primary amine group which are useful in the preparation of the compositions of the invention include ethylene diamine, triethylene tetramine, propylene diamine, tripropylene tetramine, tetraethylene pentamine, hexamethylene diamine, 3 dimethylamino propylamine, 3 diethylamino propylamine, 1,4-diaminobutane, 2-dimethylamino ethylamine, etc.

Since the compositions of the invention generally are prepared in water, the formaldehyde generally is an aqueous solution such as, for example, an aqueous solution containing 37% formaldehyde which is commercially available as Formalin. Formaldehyde generators such as paraformaldehyde, trioxane, etc., may be utilized in the process as a source of formaldehyde.

The reaction between the formaldehyde, sulfamic acid and amine compound is conducted initially at about room temperature although the reaction proceeds exothermically. In order to insure completion of the reaction, the mixture may be heated to the reflux temperature of the mixture and preferably is heated to a temperature of about 65–80° C and maintained at this temperature for up to about one hour.

The relative amounts of the materials used to form the intermediate composition, namely, sulfamic acid, amine compound and formaldehyde may vary, and generally, the mixture used to form the intermediate comprises from about 0.5 to 2 molar parts of sulfamic acid, 0.5 to 2 molar parts of amine and about 1 to 4 molar parts of formaldehyde. Preferably the mole ratio of sulfamic acid to amine will be between 2:1 to 1:2, and more preferably 1:1.

The epihalohydrins that are useful in the preparation of the compositions of the invention include those having the formula

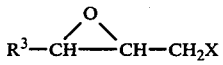

wherein $R^3$ is hydrogen or a lower alkyl group of 1 to about 5 carbon atoms and X is halogen. Epichlorohydrin is particularly preferred, and other examples include epibromohydrin and 1-chloro-2,3-epoxybutane. In lieu of, or in addition to the epihalohydrins, glycerol halohydrins having the following formula may be utilized

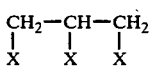

wherein at least one but not more than two of the X's are hydroxy groups and the remaining X's are chlorine or bromine. Examples of such reactants include 1,3-dichloro-2-hydroxypropane, 3-chloro-1,2-dihydroxypropane and 2,3-dichloro-1-hydroxypropane. The amount of epihalohydrin or glycerol halohydrin reacted with the intermediate composition may vary although amounts within the range of from 0.5 to 2 moles per mole of sulfamic acid in the intermediate mixture are preferred. In one embodiment the molar ratio of sulfamic acid, amine, formaldehyde and epihalohydrin or glycerol halohydrin ranges from about 1:1:1:1 to about 1:1:4:1.

The reaction between the epihalohydrin or glycerol haloydrin or mixtures thereof with the intermediate composition described above may be conducted at any temperature between room temperature and the reflux temperature of the mixture. Obviously, shorter reaction times are required at the reflux temperature, and at this temperature, the reaction appears to be completed in about one to two hours. The liquid compositions obtained in accordance with the above procedures can be utilized directly as a brightener additive for the aqueous acid zinc electroplating baths or may be further diluted with water prior to addition to the plating baths.

The following examples illustrate the preparation of the compositions of this invention which are particularly useful as brightener additives. Unless otherwise indicated, all parts and percentages are by weight.

EXAMPLE 1

A mixture of 102 grams (1 mole) of 3-dimethylamino propylamine and 97 grams (1 mole) of sulfamic acid is dissolved in 500 ml. of water. Formalin (164 ml., 2 moles of formaldehyde) is added dropwise with stirring and an exothermic reaction occurs. After the addition of the Formalin is completed, the reaction mixture is heated to a temperature of about 65–77° C, and this temperature is maintained for about 30 minutes.

To this intermediate composition, there is added 92 grams (1 mole) of epichlorohydrin in a dropwise manner and an exothermic reaction occurs. After the addition is completed, the mixture is heated at the reflux temperature for two hours and cooled to room temperature.

EXAMPLE 2

The procedure of Example 1 is repeated except that the epichlorohydrin is replaced by 1 mole of glycerol chlorohydrin.

EXAMPLE 3

The procedure of Example 1 is repeated except that 246 ml. of Formalin (3 moles of formaldehyde) are used in the preparation of the intermediate compound.

EXAMPLE 4

The procedure of Example 1 is repeated except that the 3-dimethylamino propylamine is replaced by 1 mole of ethylene diamine.

EXAMPLE 5

The procedure of Example 1 is repeated except that the Formalin is replaced by an equivalent amount of paraformaldehyde.

EXAMPLE 6

A mixture of 6.0 grams of ethylene diamine and 9.7 grams of sulfamic acid are dissolved in 50 cc. of water, and the mixture is heated to about 70° C. Formalin (16.4 cc.) is added dropwise, and the temperature of the mixture is maintained at 70° C for an additional 30 minutes. Epichlorohydrin (9.2 grams) is added dropwise and the mixture is heated at the reflux temperature for about two hours. After cooling, the product of the reaction may be used as is or further diluted with water.

EXAMPLE 7

The procedure of Example 6 is repeated except that the ethylene diamine is replaced by 14.6 grams of triethylene tetramine.

EXAMPLE 8

The procedure of Example 6 is repeated except that the ethylene diamine is replaced by 11.6 grams of hexamethylene diamine.

EXAMPLE 9

The procedure of Example 6 is repeated except that the ethylene diamine is replaced by 9.5 grams of guanidine hydrochloride and 13.8 grams of epichlorohydrin is used.

As mentioned above, the compositions of the invention such as those described in the above examples are particularly useful as brightening additives for aqueous acidic zinc plating baths which are well known to those skilled in the art. Such baths contain free zinc ions and are prepared with zinc sulfate, zinc chloride, zinc fluoroborate and/or zinc sulphamate. The zinc plating bath normally will contain conducting salts. Examples of conducting salts utilized in the acid zinc plating bath of the invention include sodium chloride, sodium fluoride, ammonium chloride, ammonium fluoride, etc.

The amount of the above-described compositions of the invention which is added to the aqueous acidic zinc electroplating baths of the invention is an amount sufficient to produce a bright and level zinc deposit on a substrate, and generally the amount may range from about 0.00 to about 10 grams per liter of bath and is preferably from about 0.1 to about 6 grams per liter of bath.

The acid zinc electroplating baths containing the novel compositions of the invention may be utilized to produce bright zinc deposits on all types of metals and alloys, for example, on iron, zinc die cast, copper and brass, and the compositions of the invention may be added to zinc plating baths employed in all types of industrial zinc plating processes including still plating baths, high-speed plating baths for strip or wire plating, and in barrel plating.

The properties of the zinc deposited from the aqueous acidic baths of the invention may be enhanced further by including in the bath, a small amount of one or more polyoxyalkylated naphthols which are obtained by reacting a naphthol with an alkylene oxide such as ethylene oxide and propylene oxide, and more particularly, with from about 6 to about 40 moles of ethylene oxide per mole of naphthol. The naphthol reactant may be either alpha or beta naphthol and the naphthalene ring may contain various substituents such as alkyl groups or alkoxy groups, especially lower alkyl and lower alkoxy groups of up to about 7 carbon atoms each, so long as the polyoxyalkylated naphthol remains bath-soluble. When present, there usually will not be more than two such substituents per polyoxyalkylated naphthol; that is, two lower alkoxy groups, two lower alkyl groups, or a lower alkyl or a lower alkoxy group. The preferred polyoxyalkylated naphthols are ethoxylated naphthols having the formula

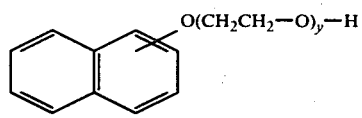

$$\text{IV}$$

wherein y is from about 6 to about 40 and preferably from about 8 to about 20. The amount of polyoxyalkylated naphthol included in the baths of the invention may vary within the range of from about 0.1 to about 20 grams or more per liter of bath.

In addition to the above-described polyoxyalkylated naphthols which are considered to be wetting agents, the incorporation of one or more other wetting or surface active agents into the additive composition and zinc plating baths of the invention results in a zinc plating with improved leveling and brightness, and the additive composition and plating baths exhibit improved stability.

Wetting agents based on ethylene and propylene oxide, for example, polyglycol compounds and the like, and sulfonated wetting agents also are useful at levels of about 1 to 25 g/l and preferably at about 3–5 g/l of bath. In general, the nonionic wetting agents such as those containing ether linkages are particularly useful additives. Examples of such ether-containing wetting agents are those having the general formula $$R^4\text{—O—}[(CH_2)_nO]_xH \qquad (V)$$

wherein $R^4$ is an aryl or alkyl group containing from about 6 to 20 carbon atoms, n is two or three, and x is an integer between 2 and 100. Such wetting agents are produced generally by treating fatty alcohols or alkyl-substituted phenols with excess ethylene oxide or propylene oxide. The alkyl carbon chain may contain from about 14 to 24 carbon atoms and may be derived from a long chain fatty alcohol such as oleyl alcohol or stearyl alcohol.

Nonionic polyoxyethylene compounds of this type, and their utility in acid zinc baths containing ammonium ions are described in U.S. Pat. No. 3,855,085. Such polyoxyethylene compounds are available commercially under the general trade designations "Surfynol" by Air Products and Chemicals, Inc. of Wayne, Pa., and under the designation "Pluronic" or "Tetronic" by BASF Wyandotte Corp. of Wyandotte, Mich. Examples of specific polyoxyethylene condensation products useful in the invention include "Surfynol 465" which is a product obained by reacting about 10 moles of ethylene oxide with 1 mole of tetramethyldecynediol. "Surfynol 485" is the product obtained by reacting 30 moles of ethylene oxide with tetramethyldecynediol. "Pluronic L 35" is a product obtained by reacting 22 moles of ethylene oxide with polypropylene glycol obtained by the condensation of 16 moles of propylene glycol.

Amine, long chain fatty amine, long chain fatty acid, alkanol amines, diamines, amides, alkanol amides and polyglycol-type wetting agents known in the art are also useful. One type of amine wetting agent found particularly useful in a zinc plating bath is the group obtained by the addition of a mixture of propylene oxide and ethylene oxide to diamines. More specifically, compounds formed by the addition of propylene oxide to ethylene diamine followed by the addition of ethylene oxide are useful and are available commercially from BASF Wyandotte Ind. Chemical Group under the general trade designation "Tetronic".

Carbowax-type wetting agents which are polyethylene glycols having different molecular weights have been found to give good results. For example Carbowax No. 1000 has a molecular weight range of from about 950 to 1,050 and contains from 20 to 24 ethoxy units per molecule. Carbowax No. 4000 has a molecular weight range of from about 3000 to 3700 and contains from 68 to 85 ethoxy units per molecule. Other known nonionic glycol derivatives such as polyalkylene glycol ethers and methoxy polyethylene glycols which are available commercially can be utilized as wetting agents in the compositions of the invention.

Other alkoxylated amines which are useful wetting agents are represented by the formulas VI and VII

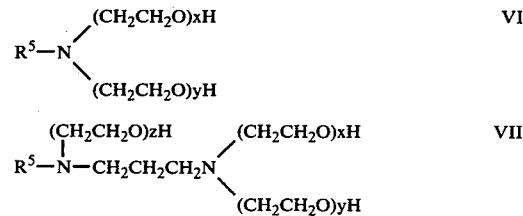

wherein $R^5$ is a fatty amine alkyl group containing from 12 to 18 carbon atoms, and x, y and z are each independently integers from 1 to about 30, and the sum of x, y and z is an integer of from about 2 to about 50.

The above described alkoxylated amines are known in the art as cationic surfactants and are available from a variety of commercial sources. The brighteners of the type represented by formula VI can be prepared by condensing various amounts of ethylene oxide with primary fatty amines which may be a single amine or a mixture of amines such as are obtained by the hydrolysis of tallow oils, sperm oils, coconut oils, etc. Specific examples of fatty acid amines containing from 8 to 22 carbon atoms include saturated as well as unsaturated aliphatic amines such as octyl amine, decyl amine, lauryl amine, stearyl amine, oleyl amine, myristyl amine, palmityl amine, dodecyl amine, and octadecyl amine.

The alkoxylated amines which are useful in the plating baths of the invention can be prepared, as mentioned above, by condensing alkylene oxides with the above-described primary amines by techniques known to those in the art. A number of such alkoxylated amines is commercially available from a variety of sources. The alkoxylated amines of the type represented by formula VI are available from the Armak Chemical Division of Akzona, Inc., Chicago, Ill., under the general trade designation "Ethomeen". Specific examples of such products include "Ethomeen C/15" which is an ethylene oxide condensate of a coconut fatty amine containing about 5 moles of ethylene oxide; "Ethomeen C/20" and "C/25" which also are ethylene oxide condensation products from coconut fatty amine containing about 10 and 15 moles of ethylene oxide respectively; "Ethomeen S/15" and "S/20" which are ethylene oxide condensation products with stearyl amine containing about 5 and 10 moles of ethylene oxide per mole of amine respectively; and "Ethomeen T/15" and "T/25" which are ethylene oxide condensation products of tallow amine containing about 5 and 15 moles of ethylene oxide per mole of amine respectively. Commercially available examples of the alkoxylated amines of the type represented by formula VII include "Ethoduomeen T/13" and "T/20" which are ethylene oxide condensation products of N-tallow trimethylene diamine containing about 3 and 10 moles of ethylene oxide per mole of diamine respectively.

The brightness of the zinc deposit obtained with the baths and process of the invention also is improved if the bath contains at least one aromatic carbonyl containing compound such as aromatic aldehydes, aromatic ketone, aromatic carboxylic acids and salts thereof, or mixtures of such aromatic carbonyl containing compounds. The supplementary brighteners impart optimum leveling action over a wide plating range. The following compounds will illustrate the types of aromatic carbonyl containing compounds which are useful as brighteners in the plating baths of the invention: ortho-chlorobenzaldehyde, para-chlorobenzaldehyde, benzylidene acetone, coumarin, 1,2,3,6-tetrahydrobenzaldehyde, acetophenone, propiophenone, furfurylidine acetone, 3-methoxybenzal acetone, benzaldehyde, vanillin, hydroxybenzaldehyde, anisicaldehyde, benzoic acid, sodium benzoate, sodium salicylate, 3-pyridine carboxylic acid, etc. Mixtures of one or more of the aldehydes with one or more ketones also are useful. When employed in the baths of the invention, the brighteners will be included within the range of from about 0.02 to about 1 gram per liter and preferably from about 0.03 to about 0.5 gram per liter of bath.

The acidic zinc plating baths of the present invention will deposit a bright, level and ductile zinc deposit on substrates at any conventional temperature such as from about 20° to about 60° C and, more preferably, from about 20° to about 35° C. The acidity of the baths may vary from a pH of from about 3 or 4 to about 6, but preferably is operated at a pH of about 5.0 to about 5.7. Hydrochloric acid may be added to the bath to lower the pH, and potassium or ammonium hydroxide may be used to raise the pH when necessary. The choice of particular acid or base will depend on the chemicals in the bath as is well known to those skilled in the art. For example, in the following Example A, ammonium hydroxide would be the preferred base to raise the pH of the bath.

The following examples illustrate the aqueous acidic zinc plating baths of the invention.

Example A

| | |
|---|---|
| zinc chloride | 30 g/l |
| ammonium chloride | 200 g/l |
| reaction product of beta-naphthol with 10 moles of ethylene oxide | 4.0 g/l |
| benzylidene acetone | 0.1 g/l |
| product of Example 1 | 12 ml/l |
| pH | 5.5 |

Example B

| | |
|---|---|
| zinc sulfate | 34 g/l |
| ammonium chloride | 150 g/l |
| reaction product of beta-naphthol with 12 moles of ethylene oxide | 10 g/l |
| product of Example 2 | 10 g/l |
| pH | 5.2 |

Example C

| | |
|---|---|
| zinc chloride | 30 g/l |
| ammonium chloride | 200 g/l |
| product of Example 1 | 10 g/l |
| pH | 5.5 |

Example D

| | |
|---|---|
| zinc chloride | 40 g/l |
| ammonium chloride | 175 g/l |
| reaction product of beta-naphthol with 15 moles of ethylene oxide | 5 g/l |
| benzaldehyde | 2 g/l |
| product of Example 4 | 10 g/l |
| pH | 5.4 |

Example E

| | |
|---|---|
| zinc chloride | 30 g/l |
| ammonium chloride | 200 g/l |
| reaction product of beta-naphthol with 10 moles of ethylene oxide | 4.0 g/l |
| piperonal | 1 g/l |
| product of Example 6 | 12 ml/l |
| pH | 5.5 |

Example F

| | |
|---|---|
| zinc chloride | 75 g/l |
| ammonium chloride | 200 g/l |
| reaction product of beta-naphthol with 12 moles of ethylene oxide | 4.0 g/l |
| benzylidene acetone | 0.1 g/l |
| product of Example 7 | 4 ml/l |
| pH | 5.5 |

Example G

| | |
|---|---|
| zinc chloride | 30 g/l |
| ammonium chloride | 200 g/l |
| reaction product of beta-naphthol with 10 moles of ethylene oxide | 4.0 g/l |
| benzylidene acetone | 0.1 g/l |
| Product of Example 8 | 12 ml/l |
| pH | 5.5 |

Example H

| | |
|---|---|
| zinc chloride | 30 g/l |
| ammonium chloride | 200 g/l |
| ethoxylated nonylphenol (Surfonic N-150) | 4 g/l |
| benzylidine acetone | 0.1 g/l |
| product of Example 1 | 12 ml/l |
| pH | 5.5 |

Example 1

| | |
|---|---|
| zinc chloride | 30 g/l |
| ammonium chloride | 200 g/l |
| polyoxyethylene(20)sorbitan monopalmitate (Tween 40 from ICI America Inc.) | 3 g/l |
| product of Example 1 | 12 ml/l |
| benzylidine acetone | 0.1 g/l |
| pH | 5.5 |

Example

| | |
|---|---|
| zinc chloride | 30 g/l |
| ammonium chloride | 200 g/l |
| tetramethyl decynediol ethoxylated with 10 moles ethylene oxide | 5 g/l |
| benzylidine acetone | 0.1 g/l |
| product of Example 1 | 12 ml/l |
| pH | 5.5 |

In practice, the improved zinc plating baths of the invention provide bright and level electrodeposits over a current density range of from as low as 0 A.S.F. to well over 200 A.S.F. as measured with a Hull cell scale. For example, the bath of Example H deposits a bright level electrodeposit over a range of from 0 to over 120 A.S.F. at a current of 3 amps for 5 minutes. The bath of Example 1 deposits a dull plate from 0 to 12 A.S.F., a bright plate from 12 to 90 A.S.F. and a semi-bright plate from 90 to over 120 A.S.F. The bath of Example J deposits a bright plate in a Hull cell from 0 to over 120 A.S.F.

The plating baths of the invention may be operated on a continuous or intermittent basis, and from time to time, the components of the bath have to be replenished. The various components may be added singularly as required or may be added in combination. The amounts of the various additive compositions to be added to the plating baths may be varied over a wide range depending on the nature and performance of the zinc plating bath to which the composition is added. Such amounts can be determined readily by one skilled in the art.

Another aspect of the invention relates to additive compositions which may be mixtures of the novel compositions of this invention with other additives without any solvent or carrier, or they may be concentrates of bath components in water, alcohols, or mixtures of water and one or more alcohols. The additive compositions will comprise, in addition to the novel compositions of this invention which are the reaction products described above, one or more of the desirable additional bath components such as the polyoxyalkylated naphthols and the aromatic aldehydes or ketones. The amounts of the compounds in the additive compositions or concentrates will be such that when they are diluted, they will provide the requisite amounts of the components in the bath or the requisite amounts of the components required to replenish the bath.

The following additive compositions or concentrates illustrate the various combinations of compounds that may be prepared and utilized in accordance with the invention for preparing or maintaining the baths of the invention and/or improving the performance of the baths of the invention.

| Additive Composition 1 | Amounts |
|---|---|
| Product of Example 1 | 12 ml |
| Reaction product of beta-naphthol with 10 moles of ethylene oxide | 4 g. |
| Water | 10 ml |
| Additive Composition 2 | |
| Product of Example 4 | 10 ml |
| Reaction product of beta-naphthol with 15 moles of ethylene oxide | 4 g. |
| Water | 11 ml |
| Additive Composition 3 | |
| Product of Example 1 | 12 ml |
| Reaction product of beta-naphthol with 10 moles of ethylene oxide | 4 g. |
| Benzylidene acetone | 0.15 g. |
| Ethyl alcohol | 6 ml |
| Water | 5 ml |
| Additive Composition 4 | |
| Product of Example 7 | 10 ml |
| Surfonic N-150 | 4 g. |
| Water | 10 ml |
| Additive Composition 5 | |
| Product of Example 1 | 12 ml |
| Tween 40 | 3 g. |
| Benzylidene acetone | 0.15 g. |
| Ethyl alcohol | 5 ml |
| Water | 6 ml |

The embodiments of the invention in which an exclusive property or privilege is claimed are defined as follows:

1. A composition comprising the reaction product obtained by the process of
   (a) preparing an intermediate composition by reacting formaldehyde in water with a mixture of
   i. sulfamic acid, and
   ii. at least one aliphatic acyclic amine containing at least one primary amine group, and
   (b) reacting said intermediate composition with at least one epihalohydrin or glycerol halohydrin or mixtures thereof.

2. The composition of claim 1 wherein the epihalodhydrin is epichlorohydrin.

3. The composition of claim 1 wherein the aliphatic acyclic amine is represented by the formula

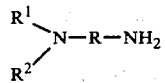

wherein
R is an alkylene group containing from about 2 to 10 carbon atoms, and
$R^1$ and $R^2$ are each independently hydrogen or alkyl groups containing from 1 to about 5 carbon atoms.

4. The composition of claim 3 wherein $R^1$ and $R^2$ are alkyl groups containing 1 or 2 carbon atoms.

5. The composition of claim 1 wherein the intermediate composition is prepared from 1 to 4 molar parts of formaldehyde, 0.5 to 2 molar parts of sulfamic acid and 0.5 to 2 molar parts of amine, and the intermediate is reacted with 0.5 to 2 molar parts of epihalohydrin or glycerol halohydrin.

6. The composition of claim 5 wherein the molar ratio of sulfamic acid, amine compound, formaldehyde, amd epihalohydrin or glycerol halohydrin is within a range of from about 1:1:1:1 to about 1:1:4:1.

7. An additive composition for an aqueous acidic zinc electrodepositing bath comprising (A) at least one composition according to any of claims 1-6 and (B) at least one polyoxyalkylated naphthol.

8. The additive of claim 7 wherein the polyoxyalkylated naphthol has the formula

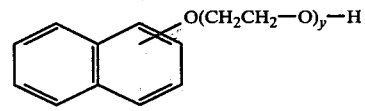

wherein Y is from about 6 to about 40.

9. The additive composition of claim 7 wherein the composition also contains (C) at least one aromatic carbonyl containing compound.

10. The additive composition of claim 7 wherein the composition also contains (D) at least one nonionic or cationic wetting agent.

11. An aqueous acidic plating bath for the electrodeposition of a bright zinc deposit on a substrate which comprises zinc ions and (A) an amount, sufficient to provide a level and bright zinc electrodeposit, of at least one bath-soluble composition according to any of claims 1-6.

12. The plating bath of claim 11 wherein the bath also contains (B) at least one polyoxyalkylated naphthol.

13. The plating bath of claim 12 wherein the polyoxyalkylated naphthol has the formula

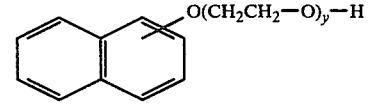

wherein y is from about 6 to about 40.

14. The plating bath of claim 13 wherein the polyoxyalkylated naphthol is derived from a beta-naphthol.

15. The plating bath of claim 11 wherein the bath also contains (C) at least one aromatic carbonyl containing compound.

16. The bath of claim 15 wherein the aromatic carbonyl containing compound is benzylidene acetone.

17. The plating bath of claim 11 wherein the bath also contains (D) at least one nonionic or cationic wetting agent.

18. The method of electrodepositing a bright zinc coating on a substrate which comprises electroplating said substrate in an aqueous acidic zinc bath comprising zinc ions and, in an amount sufficient to provide a bright level zinc electrodeposit, (A) at least one bath-soluble composition according to any of claims 1–6.

19. The method of claim 18 wherein the bath also contains (B) at least one polyoxyalkylated naphthol.

20. The method of claim 19 wherein the polyoxyalkylated naphthol has the formula

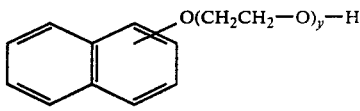

21. The method of claim 20 wherein the polyoxyalkylated naphthol is derived from a beta-naphthol.

22. The method of claim 18 wherein the bath also contains (C) an aromatic carbonyl containing compound.

23. The method of claim 18 wherein the bath also contains (D) at least one nonionic or cationic wetting agent.

* * * * *